J. Lancelott,

Making Ornamental Chains,

No. 2,147. Reissued Jan. 16, 1866.

Witnesses.

Wm. H. Green
John Gartland

Inventor.

James Lancelott.

N. PETERS, PHOTO-LITHOGRAPHER, WASHINGTON, D. C.

UNITED STATES PATENT OFFICE.

SACKETT, DAVIS & CO., OF PROVIDENCE, RHODE ISLAND, ASSIGNEES OF JAMES LANCELOTT.

IMPROVEMENT IN ORNAMENTAL CHAINS.

Specification forming part of Letters Patent No. 23,303, dated March 22, 1859; Reissue No. 2,147, dated January 16, 1866.

*To all whom it may concern:*

Be it known that JAMES LANCELOTT, formerly of Cranston, in the county of Providence and State of Rhode Island, has invented a new and Improved Sheet-Metal Ornamental Chain; and it is hereby declared that the following specification, taken in connection with the drawings, making a part of the same, is a full, clear, and exact description thereof.

Figure 1:
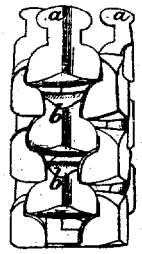
Figure 2:
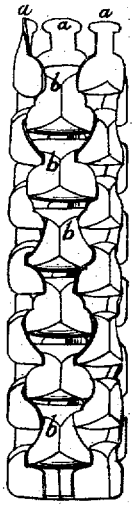
Figure 3:
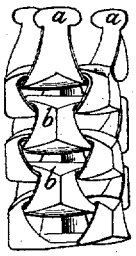
Figure 4:
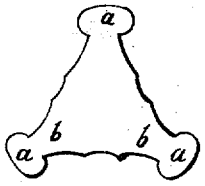
Figure 5:
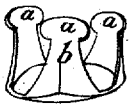

Figures 1, 2, and 3 represent three several patterns of chain, differing only in the form of arms of the links. The manner in which the links are woven together is the same in all. Fig. 4 is a blank link of the pattern used in making the chain shown in Fig. 3. Fig. 5 is the same link after it has been subjected to the first operation.

The "Adelaide" chain, as it is called in the trade, or that variety of sheet-metal chain which is made by the machine patented by Lauriston Towne, of Providence, Rhode Island, is woven by bending the two opposite arms of each link over the center of the body of the next succeeding link, so that the second pair of arms shall overlap the pair first bent down. In case the link has an odd number of arms, then they are bent down over the center singly in succession.

In that variety of chain which is represented in the drawings attached to the Letters Patent heretofore granted on the 4th day of May, A. D. 1858, to the said JAMES LANCELOTT, assignor to SACKETT, DAVIS & Co., the chain is formed by simply bending the arms of each link at a very acute angle against the inner side of the dome or cup into which the body of the next succeeding link is formed.

It is obvious that in the first description of chain but little variety in the appearance can be introduced, owing to the necessity of having the shank of the arms, which governs the character of the chain, formed with its two sides parallel to each other. The form of each link being, if four arms are employed, that of the algebraic sign of plus, with a cross-bar at the end of each arm, while in the second description of chain, although a great variety of patterns can be introduced, in consequence of the chain deriving its character principally from the conformation of the edge of the dome or cup, yet it is objectionable on account of its great deficiency in strength, unless a finer quality of stock is used in the manufacture than is for any other purpose required or than is profitable.

To make a description of plate-chain that shall not only admit of a great variety of ornamental patterns, but also when made from the ordinary qualities of stock be of sufficient strength to meet all reasonable requirements, is the object of the present invention.

The manner in which the chain is formed is as follows: A blank of sheet metal—as, for instance, one having three arms, is taken—on the extremity of each of which arms is formed a cross-bar, *a*, having its corners rounded, as shown. So much of each arm as will when bent up compose one side of the chain is cut into the ornamental form which is to distinguish the chain, care being taken in case only three arms are employed that the base of each arm shall be wider than the top. The link is then subjected to the action of a die and former, the face of which is a geometrical figure, having twice the number of sides that the link has arms, and is struck up in such manner that one of the outer angles of the forming-punch shall indent a point midway between the sides of each arm. The link is thus made to assume the form shown in Fig. 5, each of the arms being bent transversely at a right angle, or nearly so, with the base, and each also from the form of the die being bent longitudinally at the angle due to the geometrical figure into which the base is formed. A second link is then prepared in the same manner and placed with its arms between the arms of the first. The extremity of each arm of the first link is then bent over (at point *b*) toward the center of the chain, in a direction parallel with the base. By repeating this operation the chain is formed.

It will be observed the ears of the cross-bar *a* take a full bearing against the sides of the angle of two of the arms of the next succeeding link, so that when the arms of such succeeding link are bent down in the same manner the first link is held in its place, and cannot be drawn out without tearing away the metal.

The configuration of the edges of the arms will give a distinctive character to the various patterns of chain; but from the fact that each arm is bent longitudially there will be given to all the patterns of chain the appearance of being made from solid as distingished from sheet-metal stock. In addition to the better appearance thus given to the chain, it is of great importance that the arms should be longitudinally bent, as thereby a very great increase of strength is obtained.

Instead of using links having three arms only, as shown in the drawings, links with a greater number of arms can be employed, and although with a greater number of arms than three, less opportunity is afford for giving variety to the patterns, so far as the same are affected by the outline of the edges, and the general effect of the chain is the same as if made of solid wire, yet what is lost in variety and beauty of pattern is compensated by the increased strength which is obtained for the chain.

What is claimed as the invention of the said JAMES LANCELOTT, and is desired to be secured by Letters Patent, is—

1. A sheet-metal chain composed of links, the base of each of which is a polygon of six or more sides, the chain being formed by bending each arm longitudinally at the same angle, or nearly so, with one of the outer angles of the base, so that a cross-bar on the extremity of each arm of the next preceding link in the chain shall, when bent down, bear against the angular sides of two of the arms of the next succeeding link, and thereby enable the chain to withstand a strain nearly equal to the cohesive strength of the metal, the article being substantially as specified.

2. A sheet metal chain, the arms of whose links are bent longitudinally, as described, for the purpose of increasing the strength of the chain and giving to it the appearance of being made from wire instead of from sheetmetal.

THOMAS DAVIS.
GEO. P. TEW.
SAURISTON TOWNE.
GEO. H. SACKETT.

Witnesses:
JOHN F. TRESCOTT,
JOHN D. THURSTON.
As to G. H. Sackett:
SAM. L. HARRIS,